Aug. 23, 1932.  C. HOFFMAN  1,873,709
FOOD PRODUCT
Filed Aug. 20, 1924
Fig.1,
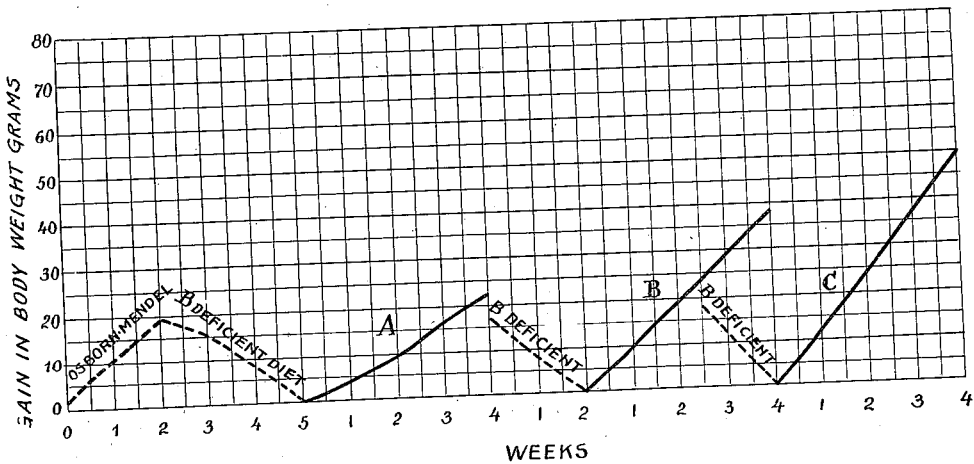
Fig.2,
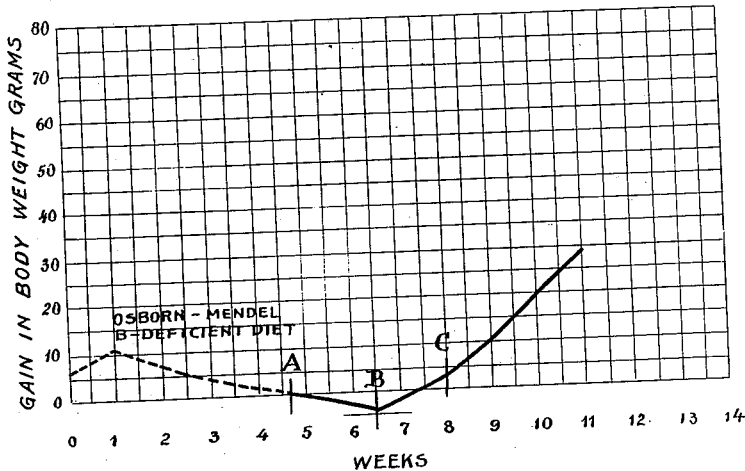
INVENTOR
Charles Hoffman
BY
Pennie Davis Marvin & Edmonds
ATTORNEY Patented Aug. 23, 1932

1,873,709

UNITED STATES PATENT OFFICE

CHARLES HOFFMAN, OF TUCKAHOE, NEW YORK, ASSIGNOR TO WARD BAKING COMPANY, OF NEW YORK, N. Y., A CORPORATION OF NEW YORK

FOOD PRODUCT

Application filed August 20, 1924. Serial No. 733,109.

The present invention relates primarily to a food product rich in vitamines and available for widely extended use in arts and industries having to do with alimentation and nutrition. Specifically this invention has to do with the food product resulting from the process disclosed in the copending application of Charles Hoffman, Harry Davett Grigsby and Nathan Minton Cregor, Serial No. 504,693 filed October 1, 1921, issued as Patent No. 1,541,263 of June 9, 1925, and the processes described in the application of Charles Hoffman for process for making food product and the application of Nathan Minton Cregor for process for making food product, which applications are filed concurrently herewith.

In its preferred form the product consists of malted sugary material having a high content of soluble sugars, proteins and mineral salts. The sugary material serves as a carrier for a large amount of vitamines, notably the water soluble B vitamine. A particular merit of the food product is the fact that it is produced from cereal germs, for instance, wheat, corn or rice germs, which germs are by-products of milling processes and are readily available upon the market in quantity at inconsiderable cost.

In the polishing of rice the germ is removed and, together with the branny material, is separated from the polished rice grain. In the manufacture of hominy, corn flour, corn meal and the like from Indian corn or maize there results a by-product which consists mainly of the corn or maize germ. Similarly in the manufacture of wheat flour by the roller mill process, there is formed a product containing the germ of the wheat and known commercially as wheat germ. The percentage of bran and other material intermingled with the cereal germs varies with the type of milling process and with the practice in individual mills, but in all instances the germ is discarded and constitutes a by-product normally of little value. Cereal germs deteriorate very rapidly after being separated from the grains, and for this reason it is impossible to store them for any considerable length of time without resort to some preservative means. Spontaneous heating of the germs also makes storage of them unsafe. The germs also contain certain bitter principles which characterize them with a decidedly bitter taste. For these reasons, and also for the reason that they are not readily digestible, cereal germs are commonly not used for human consumption but are disposed of to a large extent in stock foods and the like.

The germs of cereals, such as for instance, wheat, corn and rice, contain however, high proportions of nutritive elements. Cereal germs, particularly the wheat germ and the maize germ, have high contents of mineral salts and proteins and are particularly rich in water soluble B vitamine. It has been proposed to produce from cereal germs products suitable for human consumption by treating the germs as by roasting and grinding, or by making of them extracts or other products which may subsequently be used as food or incorporated into other food stuffs and in this way become a part of the human diet. So far as I am aware, however, no such product has met with sufficient commercial success to utilize an appreciable quantity of the available cereal germ supply.

The present invention contemplates a food product which is at once palatable and readily digestible and which is possessed of a nutritive content—notably the water soluble B vitamine—far in excess of that possessed by food products heretofore made from milling by-products. It is also an object of the invention to provide such a product of notably high nutritive value in such form as to render it capable of widely extended use, as for instance, in conjunction with or incorporated as a part of various other food products.

The production of the highly nutritive product of this application depends upon the use of raw materials, namely cereal germs, which contain the requisite nutritive elements and upon the process of treating the germs to derive from them such nutritive elements in the form of an ultimate product which is acceptable as an article of diet.

In the production of the present product the cereal germs are first freed from their oily content by an extraction process. Suitable extracting agents for this operation are benzol or carbon tetrachloride, each of which is commercially available for economical operation because of its low cost, efficiency in accomplishing the desired results and ready regeneration. After the extraction of the oil the germs are cooked with a suitable amount of water for the purpose of thoroughly gelatinizing the starch contained in them. The cooked mixture is then treated by the addition of an infusion of malt, after which digestion of the mass at suitable temperatures is conducted until all of the starch present is converted into sugars. The cooked malt digested mass is then filtered and the filtrate concentrated and dried to form the ultimate product. In commercial operation, I have found it necessary and advisable to include in the process a second treatment with malt. The second infusion of malt may be added after the final boiling to which the material is subjected subsequent to the first malt digestion; it may be added after filtration and prior to concentration of the liquor; or it may be added to the liquor after it has been concentrated to the consistency of thick syrup. I have also found it necessary to properly control the acidity of the mass during the digestion of the gelatinized starch by the malt. The process as outlined herein is fully disclosed in the above mentioned co-pending applications and no claim is made herein to the process of manufacture.

The food product of the present invention is a dry powder of yellowish brown color characterized by a sweet malty taste, which taste differs but slightly from that obtained from a mixture of pure maltose and dextrin. The product is readily soluble in water. An aqueous solution of the product exhibits a slight turbidity due probably to coagulated proteins which separate out during the drying process, but this turbidity can be removed by filtration. An aqueous solution of the product may be beaten up into a stiff froth after the fashion of egg-white. The dry product is hygroscopic and therefore must be stored in sealed containers in order that it may be preserved in the form of a dry powder. The dry product exhibits substantially the following organic analysis.

|  | Per cent |
|---|---|
| Total sugars | 76.09 |
| Maltose | 47.70 |
| Dextrin | 21.10 |
| Other carbohydrates (by diff.) | 7.29 |
| Protein (N×6.25) | 15.37 |
| Ash | 5.05 |
| Moisture | 3.50 |

From the above it will be noted that the product is high in protein and mineral salts and that the carbohydrate content of the product is largely the sugars maltose and dextrin. The total sugars are composed of about 60 to 65 parts of maltose and 35 to 40 parts of dextrin. The nitrogenous matter consists of about 30 to 40% of true protein, the remaining nitrogen being in the form of nucleic acids and amino-bodies. The mineral salt content of the product may be seen from the following chemical analysis of the ash.

|  | Per cent |
|---|---|
| Potassium oxide $K_2O$ | 39.36 |
| Phosphorus pentoxide $P_2O_5$ | 37.40 |
| Sulphuric anhydride $SO_3$ | 7.34 |
| Magnesium oxide $MgO$ | 4.80 |
| Chlorine $Cl$ | 3.80 |
| Silica $SiO_2$ | 2.74 |
| Sodium $Na$ | 2.50 |
| Calcium oxide $CaO$ | 1.28 |
| Iron $Fe_2O_3$ | 0.294 |
| Manganese $MnO_2$ | Trace |

The phosphates of the ash are present as both organic and inorganic phosphates. The organic phosphates constitute about 40% and the inorganic phosphates about 60% of the total phosphates.

The food product of this application is possessed of a notably high nutritive value. It has a particularly rich content of B vitamine. The present product differs from all other food products heretofore developed in that it possesses a nutritive value far in excess of that found in any other products. The nutritive value of a food product and its vitamine content can be determined only upon supplying the product as an article of diet and noting the results produced. The nutritive values of foods are commonly determined by feeding experiments with animals, usually white rats or pigeons, the development of the animal on a given diet being indicative of the nutritive value possessed by that diet. Feeding experiments have conclusive established that the present product is possessed of an exceedingly high B vitamine content and that the nutritive value of the product greatly exceeds that of any other product heretofore produced from milling by-products.

For the purpose of illustration, I have appended to this application a drawing showing curves which embody the results of certain feeding experiments conducted with a view to demonstrating the nutritive value of the present product. These curves are illustrated in Figures 1 and 2.

Figure 1 shows a set of curves illustrating the nutritive value of the present product as compared to ordinary dry malt extract, that is, a dry extract of malt digested wheat. The feeding experiments, the results of which are embodied in the curves, were carried on in the usual manner by feeding equal numbers of animals with certain kinds of food, and the average weight for each group determined at regular intervals and tabulated. The animals used in the experiments were all of substantially the same age and weight, and the curves are plotted to gain in body weight as ordinates and time as abcissae. In the experiments the results of which are recorded in the curves of Figure 1, the animals were fed for a time on a standard diet (known as the Osborne-Mendell B deficient diet) which is deficient in B vitamine. Under the influence of this diet the weight of the animals decreased as shown by the dotted portions of the curves of Figure 1. The animals were divided into three groups. One group represented by curve A was then given this B vitamine deficient diet supplemented by one gram daily of dry extract of malt digested wheat. The second group had its B vitamine deficient diet supplemented by $\frac{1}{10}$ of a gram daily of the food product of the present application. The third group had its B vitamine deficient diet supplemented by $\frac{2}{10}$ of a gram daily of the food product of the present application. The average weight of the animals in group A increased subsequent to the addition of the dry extract of malt digested wheat to the diet. In the same length of time the average weight of group B increased much more than was the case with group A. Thus the addition to the vitamine B deficient diet of $\frac{1}{10}$ of a gram daily of the food product of the present application produced in the test animals a much greater increase in weight than did the addition to the diet of an entire gram of dry extract of malt digested wheat. In other words, the present product produced a much greater increase in weight in the test animals than did the dry extract of malt digested wheat, altho only $\frac{1}{10}$ as much of the present product was used. When $\frac{2}{10}$ of a gram daily of the present product was used, the increase in weight of the test animals was over twice as much as that obtained with the dry extract of malt digested wheat used in quantities of an entire gram; that is, five times as much daily. The malt extract employed in the experiments whose results are tabulated in curve A of Figure 1, was obtained by cooking and malting entire wheat grains and then filtering and concentrating the liquor to a dry product.

It is therefore clear that the present product has a nutritive value many times greater than the malt extract product. It is also clear that the present product has a notably high B vitamine content due to the rapid growth produced in the animals previously fed on the B vitamine deficient diet. It is also clear that the B vitamine content of the present product is greatly in excess of that of the malt extract product.

Figure 2 furnishes a further comparison between the nitritive value and B vitamine content of the present product and that of a standard commercial malt extract which was dried in a vacuum. This malt extract exhibits an organic analysis as follows:

|  | Per cent |
|---|---|
| Total sugars | 96.97 |
| Maltose | 76.39 |
| Dextrin | 20.58 |
| Protein | 2.00 |
| Ash | 1.02 |

A group of animals was fed on a B vitamine deficient diet until their average weight decreased as shown by the dotted portion of the curve. At the point marked A, the B vitamine deficient diet was supplemented by $\frac{1}{10}$ of a gram daily of dried malt extract. Scarcely any change in the condition of the animals was noted, their weight continuing to gradually decrease as it had done during the time the B vitamine deficient diet alone was being fed. At B, $\frac{1}{10}$ of a gram daily of the food product of the present application was substituted for the dried malt extract with the result that a rapid gain in body weight of the animals occurred. At C $\frac{2}{10}$ of a gram of the present product was added to the diet and an increased rate of gain in body weight of the animals was noted. From this it is evident that the present product is exceedingly potent in B vitamine and that its nutritive value and B vitamine content is greatly in excess of that of the malt extract.

The food product of this application is agreeably palatable and pleasant to the taste. It has a valuable application as a constituent for use in the preparation of infant foods for the reason that it supplies large amounts of mineral salt, proteins and other nitrogenous bodies and the sugars, maltose and dextrin. Of particular value is its content of vitamine B. The vitamine B content of this product is greatly in excess of the vitamine B content of any other product at present used in the preparation of infant foods. This food product is particularly valuable for convalescents, and has an important application in the building up of undernourished or weakened systems. The product is easily digested because of its ready solubility and by reason of its composition. The product has a malty taste and for this reason is particularly applicable for use in malted milks to furnish a pleasantly flavored drink having unusual nutritional properties. It is applicable for use in the making of various liquid beverages for soda fountain dispensation and may also readily be compounded with candies and syrups. Since the product is composed largely of sugars and is sweet to the taste, it may be used in lieu of sugar on such dishes as breakfast cereals and the like.

The present application relates to the food product described herein. I do not make claim in this application to the process of producing the product or of producing the vitamine extract from the cereal germs for the reason that that process with its various steps forms the subject matter of the above mentioned copending applications. The scope of this invention is defined in the appended claims.

I claim:

1. The food product derived from cereal germs which consists of a solid material hygroscopic in character which contains approximately 76% of sugars, approximately 15% of protein, approximately 5% of ash and the remainder moisture.

2. The food product obtained from cooked oil free cereal germs, consisting of the concentrated malted extract from said germs, said product being comprised of approximately 76% sugars, consisting of 60 to 65 parts of maltose and 35 to 40 parts of dextrin, protein and ash consisting of mineral matter, chiefly potassium oxide and organic and inorganic phosphates with smaller amounts of magnesium, silicon, sodium, calcium and iron compounds.

3. The food product derived from cereal germs which consists of a yellowish brown hygroscopic powder containing approximately 76% of sugars, chiefly maltose and dextrin, approximately 15% of protein, approximately 5% of mineral salts rich in phosphates, the said phosphates consisting of about 40% of organic phosphates and about 60% of inorganic phosphates and the remainder moisture.

4. A substantially completely water soluble hygroscopic food product which comprises about 76% of sugars consisting mainly of maltose and dextrin and has a high content of water soluble B vitamin.

5. A food product as defined in claim 4, having a B vitamin content of at least ten times the B vitamin content of dried commercial malt extract made from malt digested wheat.

6. A food product as defined in claim 4, having about 60 to 65% of the sugars in the form of maltose and 35 to 40% in the form of dextrin.

7. A food product as defined in claim 4, having about 15% protein and about 5% ash.

8. A food product comprising about 76% sugars, of which about 60 to 65% is maltose and 35 to 40% is dextrin, about 15% protein, 5% ash and a high content of water soluble B vitamin.

In testimony whereof I affix my signature.

CHARLES HOFFMAN.